US012771140B2

(12) United States Patent
Chen et al.

(10) Patent No.: US 12,771,140 B2
(45) Date of Patent: Oct. 20, 2026

(54) MICROINVERTER, PHOTOVOLTAIC SYSTEM, AND CONTROL METHOD

(71) Applicant: Sungrow Power Supply Co., Ltd., Hefei (CN)

(72) Inventors: Qiaodi Chen, Hefei (CN); Yu Gu, Hefei (CN); Jun Xu, Hefei (CN); Zichen Wang, Hefei (CN); Hao Wang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 121 days.

(21) Appl. No.: 18/867,402

(22) PCT Filed: Mar. 3, 2023

(86) PCT No.: PCT/CN2023/079504

§ 371 (c)(1),
(2) Date: Nov. 19, 2024

(87) PCT Pub. No.: WO2024/108798

PCT Pub. Date: May 30, 2024

(65) Prior Publication Data

US 2026/0221778 A1 Jul. 30, 2026

(30) Foreign Application Priority Data

Nov. 22, 2022 (CN) ......................... 202211474154.5

(51) Int. Cl.
*H02J 3/38* (2006.01)
*H02J 3/44* (2006.01)
(Continued)

(52) U.S. Cl.
CPC ................ *H02J 3/381* (2013.01); *H02J 3/44* (2013.01); *H02M 3/33573* (2021.05); *H02M 3/33584* (2013.01); *H02J 2101/24* (2026.01)

(58) Field of Classification Search
CPC .................. H02J 3/40; H02J 3/44; H02J 3/38
See application file for complete search history.

(56) References Cited

U.S. PATENT DOCUMENTS 8,456,865 B1 6/2013 Bianchi et al.
8,614,901 B2 * 12/2013 Victor ..................... H02M 3/01 363/124

(Continued)

FOREIGN PATENT DOCUMENTS

CN 108900089 A 11/2018
CN 114884385 A 8/2022

(Continued)

OTHER PUBLICATIONS

International Search Report and Written Opinion for International Application No. PCT/CN2023/079504, mailed Jul. 28, 2023.

(Continued)

*Primary Examiner* — Ryan Johnson
*Assistant Examiner* — Esayas G Yeshaw
(74) *Attorney, Agent, or Firm* — Wolf, Greenfield & Sacks, P.C.

(57) ABSTRACT

A micro inverter, a photovoltaic system and a control method are provided. The micro inverter includes a controller, a primary H-bridge, a transformer, a bi-directional switch leg, and a capacitor leg An input terminal of the primary H-bridge is connected to a direct-current power supply, two output terminals of the primary H-bridge are respectively connected to two terminals of a primary side of the transformer, two terminals of a secondary side of the transformer are respectively connected to an intermediate terminal of the bi-directional switch leg and an intermediate terminal of the capacitor leg, and the bi-directional switch leg and the capacitor leg are connected in parallel. The controller is configured to switch a control mode of the primary H-bridge and the bi-directional switch leg in a case (Continued)

that a phase of a grid voltage is an odd multiple of 0.25π in each cycle.

17 Claims, 3 Drawing Sheets

(51) Int. Cl.
*H02M 3/335* (2006.01)
*H02J 101/24* (2026.01)

(56) References Cited

U.S. PATENT DOCUMENTS

| | | | | |
|---|---|---|---|---|
| 9,190,920 | B2 | 11/2015 | Zhang et al. | |
| 11,007,891 | B1 * | 5/2021 | Kamal | B60L 53/11 |
| 2014/0253029 | A1 * | 9/2014 | Uchida | B60L 3/12<br>320/108 |
| 2017/0271912 | A1 * | 9/2017 | Bhowmik | H02J 3/32 |
| 2017/0294875 | A1 | 10/2017 | Xu et al. | |
| 2017/0310241 | A1 * | 10/2017 | Wu | H02M 7/25 |
| 2021/0408922 | A1 * | 12/2021 | Zhang | H02M 1/0074 |
| 2023/0049948 | A1 * | 2/2023 | Drofenik | H02M 1/088 |
| 2024/0128890 | A1 * | 4/2024 | Zhang | H02M 1/007 |

FOREIGN PATENT DOCUMENTS

| | | | |
|---|---|---|---|
| CN | 114977872 | A | 8/2022 |
| CN | 115021570 | A | 9/2022 |
| CN | 115242097 | A | 10/2022 |
| JP | 2007-116817 | A | 5/2007 |

OTHER PUBLICATIONS

Yang et al., Optimal Modulation Strategy of Dual-Active-Bridge Microinverter Based on Mode Switching. Proceedings of the CSEE, Dec. 5, 2023;43(23):9273-84.

First Examination Report for Australian Patent Application No. 2023387478, dated Oct. 3, 2025.

First Office Action for Chinese Application No. 202211474154.5, dated May 18, 2026.

* cited by examiner

MICROINVERTER, PHOTOVOLTAIC SYSTEM, AND CONTROL METHOD

The present application is the national phase of International Patent Application No. PCT/CN2023/079504, titled "MICROINVERTER, PHOTOVOLTAIC SYSTEM, AND CONTROL METHOD", filed on Mar. 3, 2023, which claims priority to Chinese Patent Application No. 202211474154.5, titled "MICROINVERTER, PHOTOVOLTAIC SYSTEM, AND CONTROL METHOD", filed on Nov. 22, 2022 with the China National Intellectual Property Administration both of which are incorporated herein by reference in their entireties.

FIELD

The present disclosure relates to the technical field of photovoltaic power generation, and in particular to a micro inverter, a photovoltaic system and a control method.

BACKGROUND

With the development of photovoltaic power generation, photovoltaic power generation is increasingly applied to households, that is, household use. Micro inverters can track the maximum power of a single photovoltaic module. Compared to string inverters and centralized inverters, micro inverters do not have the "barrel effect" and are less affected by shading. In addition, due to the relatively low voltage of the single photovoltaic module, micro inverters are safer than the string inverters, so that the micro inverters are widely used.

At present, micro inverters in operation may switch between various control modes. How to control a micro inverter to switch between different control modes under required conditions is a technical problem to be solved.

SUMMARY

In view of this, a micro inverter, a photovoltaic system and a control method are provided according to the present disclosure, to reduce the number of switching control modes and improve power conversion efficiency.

A micro inverter is provided according to the present disclosure. The micro inverter includes: a controller, a primary H-bridge, a transformer, a bi-directional switch leg, and a capacitor leg. An input terminal of the primary H-bridge is connected to a direct-current power supply. Two output terminals of the primary H-bridge are respectively connected to two terminals of a primary side of the transformer. Two terminals of a secondary side of the transformer are respectively connected to an intermediate terminal of the bi-directional switch leg and an intermediate terminal of the capacitor leg. The bi-directional switch leg and the capacitor leg are connected in parallel. The controller is configured to switch a control mode of the primary H-bridge and the bi-directional switch leg in a case that a phase of a grid voltage is an odd multiple of 0.25π in each cycle.

A micro inverter is provided according to the present disclosure. The micro inverter includes: a controller, a primary H-bridge, a transformer, a bi-directional switch leg, and a capacitor leg. An input terminal of the primary H-bridge is connected to a direct-current power supply. Two output terminals of the primary H-bridge are respectively connected to two terminals of a primary side of the transformer. Two terminals on a secondary side of the transformer are respectively connected to an intermediate terminal of the bi-directional switch leg and an intermediate terminal of the capacitor leg. The bi-directional switch leg and the capacitor leg are connected in parallel. The controller is configured to: in a case that an instruction power of the micro inverter is less than or equal to a preset power, adopt a first control mode to control the primary H-bridge and the bi-directional switch leg; in a case that the instruction power of the micro inverter is greater than the preset power and a phase is greater than 0.25π and less than 0.75π or the phase is greater than 1.25π and less than 1.75π, adopt a second control mode; and in a case that the instruction power of the micro inverter is greater than the preset power and the phase is in other phase intervals, adopt the first control mode. A positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

A micro inverter is provided according to the present disclosure. The micro inverter includes: a controller, a primary H-bridge, a transformer, a bi-directional switch leg, and a capacitor leg. An input terminal of the primary H-bridge is connected to a direct-current power supply. Two output terminals of the primary H-bridge are respectively connected to two terminals of a primary side of the transformer. Two terminals of a secondary side of the transformer are respectively connected to an intermediate terminal of the bi-directional switch leg and an intermediate terminal of the capacitor leg. The bi-directional switch leg and the capacitor leg are connected in parallel. The controller is configured to: in a case that an instruction power of the micro inverter is less than or equal to a preset power, adopt a first control mode or a third control mode to control the primary H-bridge and the bi-directional switch leg; and in a case that the instruction power of the micro inverter is greater than the preset power, adopt a second control mode to control the primary H-bridge and the bi-directional switch leg. A positive voltage overlap interval between voltages of the primary side and voltages of the secondary side of the transformer corresponding to the first control mode, a positive voltage overlap interval between voltages of the primary side and voltages of the secondary side of the transformer corresponding to the second control mode, and a positive voltage overlap interval between voltages of the primary side and voltages of the secondary side of the transformer corresponding to the third control mode are different.

A photovoltaic system is further provided according to the present disclosure. The photovoltaic system includes the micro inverter described above. The direct-current power supply is a photovoltaic module.

A control method for a micro inverter is further provided according to the present disclosure. The micro inverter includes: a primary H-bridge, a transformer, a bi-directional switch leg and a capacitor leg. The control method includes: switching a control mode of the primary H-bridge and the bi-directional switch leg in a case that the phase of the grid voltage is an odd multiple of 0.25π in each cycle.

A control method for a micro inverter is further provided according to the present disclosure. The micro inverter includes: a primary H-bridge, a transformer, a bi-directional switch leg and a capacitor leg. The control method includes: adopting a first control mode to control the primary H-bridge and the bi-directional switch leg in a case that an instruction power of the micro inverter is less than or equal to a preset power; adopting a second control mode in a case that the instruction power of the micro inverter is greater than the preset power and a phase is greater than 0.25π and less than 0.75π or the phase is greater than 1.25π and less than 1.75π; and adopting the first control mode in a case that the instruction power of the micro inverter is greater than the preset power and the phase is in other phase intervals. A positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

A control method for a micro inverter is further provided according to the present disclosure. The micro inverter includes: a primary H-bridge, a transformer, a bi-directional switch leg and a capacitor leg. The control method includes: adopting a first control mode or a third control mode to control the primary H-bridge and the bi-directional switch leg in a case that an instruction power of the micro inverter is less than or equal to a preset power; and adopting a second control mode to control the primary H-bridge and the bi-directional switch leg in a case that the instruction power of the micro inverter is greater than the preset power. A positive voltage overlap interval between voltages of the primary side and voltages of the secondary side of the transformer corresponding to the first control mode, a positive voltage overlap interval between voltages of the primary side and voltages of the secondary side of the transformer corresponding to the second control mode, and a positive voltage overlap interval between voltages of the primary side and voltages of the secondary side of the transformer corresponding to the third control mode are different.

DETAILED DESCRIPTION

In order to enable those skilled in the art to better understand the technical solutions according to the embodiments of the present disclosure, a micro inverter is firstly described below. In the present disclosure, the micro inverter is described by taking an example in which the micro inverter is applied to a household photovoltaic.

Figure 1:
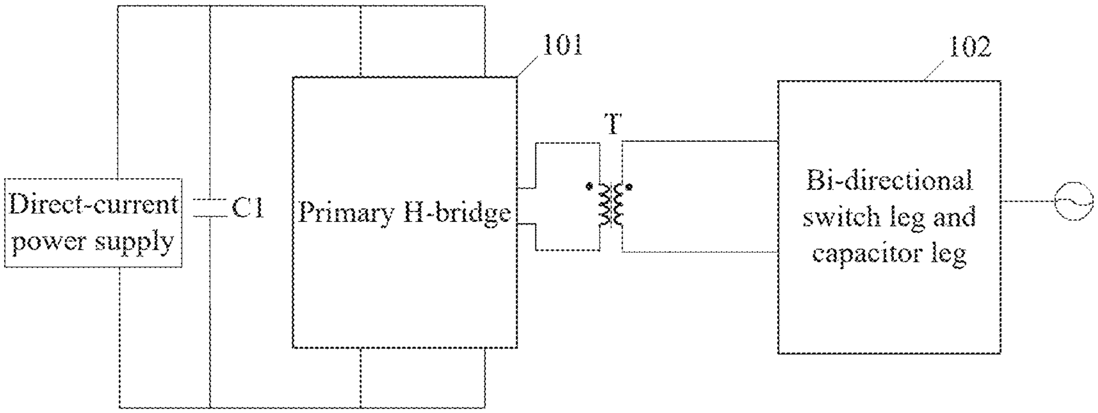
FIG. 1 is a schematic diagram of a micro inverter according to an embodiment of the present disclosure.

Reference is made to FIG. 1, which is a schematic diagram of a micro inverter according to an embodiment of the present disclosure.

The micro inverter is an isolated inverter, includes a transformer, and may perform isolation and boost of a primary side and a secondary side. The micro inverter includes a primary H-bridge 101, a transformer T, a bi-directional switch leg, and a capacitor leg 102. The transformer T includes a primary winding, a secondary winding, and an inductor L.

An input terminal of the primary H-bridge 101 is connected to a direct-current power supply. The direct-current power supply may be a photovoltaic module or a battery. In the present disclosure, descriptions are provided by taking the direct-current power supply being a photovoltaic module as an example. Two output terminals of the primary H-bridge 101 are respectively connected to two terminals of a primary side of the transformer T. Two terminals of a secondary side of the transformer T are respectively connected to an intermediate terminal of the bi-directional switch leg and an intermediate terminal of the capacitor leg. The bi-directional switch leg and the capacitor leg 102 are connected in parallel.

Figure 2:
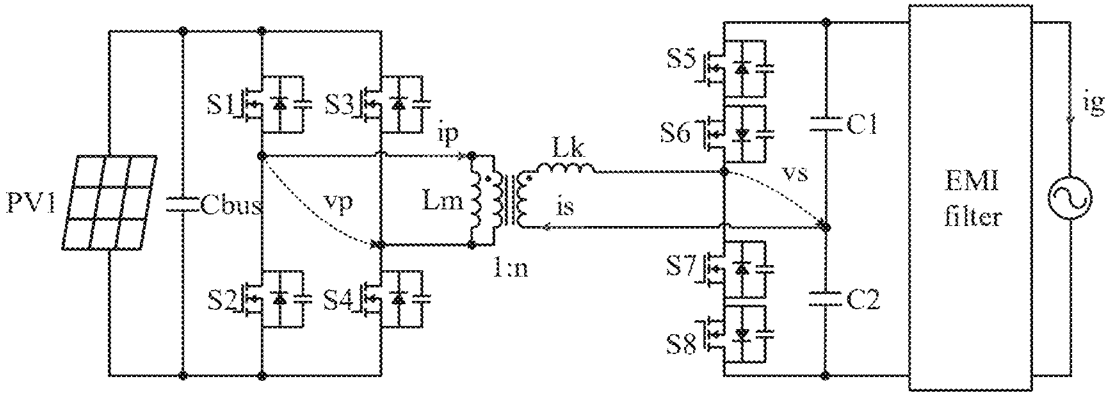
FIG. 2 is a circuit diagram of a micro inverter.

Reference is made to FIG. 2, which is a circuit diagram of a micro inverter.

As shown in FIG. 2, the primary H-bridge includes four switching transistors: S1, S2, S3 and S4. S1 and S2 are connected in series to form a first inverter bridge leg. S3 and S4 are connected in series to form a second inverter bridge leg. A common terminal of S1 and S2 is used as a first output terminal of the primary H-bridge. A common terminal of S3 and S4 is used as a second output terminal of the primary H-bridge. $v_p$ represents an output voltage, and ip represents an output current. A turn ratio of the primary winding and the secondary winding of the transformer is 1/n. Lm represents an excitation inductance of the transformer T, and Lk represents a leakage inductance of the transformer T or an inductance of an external independent inductor. is represents an output current of the transformer T. vs represents a voltage of the secondary side of the transformer T.

An upper leg of the bi-directional switch leg includes a first switching transistor S5 and a second switching transistor S6 that are connected in series. A lower leg of the bi-directional switch leg includes a third switching transistor S3 and a fourth switching transistor S4 that are connected in series. In a case that the grid voltage is greater than zero, the switching transistors at the secondary side operate in a mode 1, in which S5 and the S7 are used as high-frequency transistors for high-frequency chopping and S6 and the S8 are conducted. In a case that the grid voltage is less than zero, the switching transistors at the secondary side operate in a mode 2, in which S6 and the S8 are used as high-frequency transistors for high-frequency chopping and S5 and the S7 are conducted.

An upper leg of the capacitor leg includes at least one capacitor, and a lower leg of the capacitor leg includes at least one capacitor. In the embodiment, descriptions are provided by taking an example in which the upper leg of the capacitor leg includes C1 and the lower leg of the capacitor leg includes C2.

The micro inverter controls an external phase shift angle between the primary leg and the secondary leg and an internal phase shift angle between the two legs of the primary H-bridge to perform a single-stage grid connection function. The micro inverter has two degrees of freedom, including the internal phase shift angle $D_1$ between the two legs of the primary leg and the external phase shift angle $D_2$ between the primary leg and the secondary leg. Power may be transmitted by controlling $D_1$ and $D_2$. $D_1$ is defined as an angle by which a phase of S4 lags behind a phase of S1. $D_2$ is defined as an angle by which a phase of S5 (or S8) lags behind the phase of S1.

In addition, the output terminal of the micro inverter may further include an EMI filter circuit for filtering out an interference signal, so as to provide a high-quality grid-connected current for grid connection. ig represents an output current of the micro inverter or the grid-connected current.

The micro inverter shown in FIG. 2 includes one transformer corresponding to one PV input. It should be understood that the one PV input does not limit the number of photovoltaic modules. One photovoltaic module or multiple photovoltaic modules may be arranged. In addition, the micro inverter according to the embodiment of the present disclosure may include multiple PV inputs, corresponding to multiple transformers and multiple primary H-bridges. Detail descriptions are provided below in conjunction with the drawings.

Figure 3:
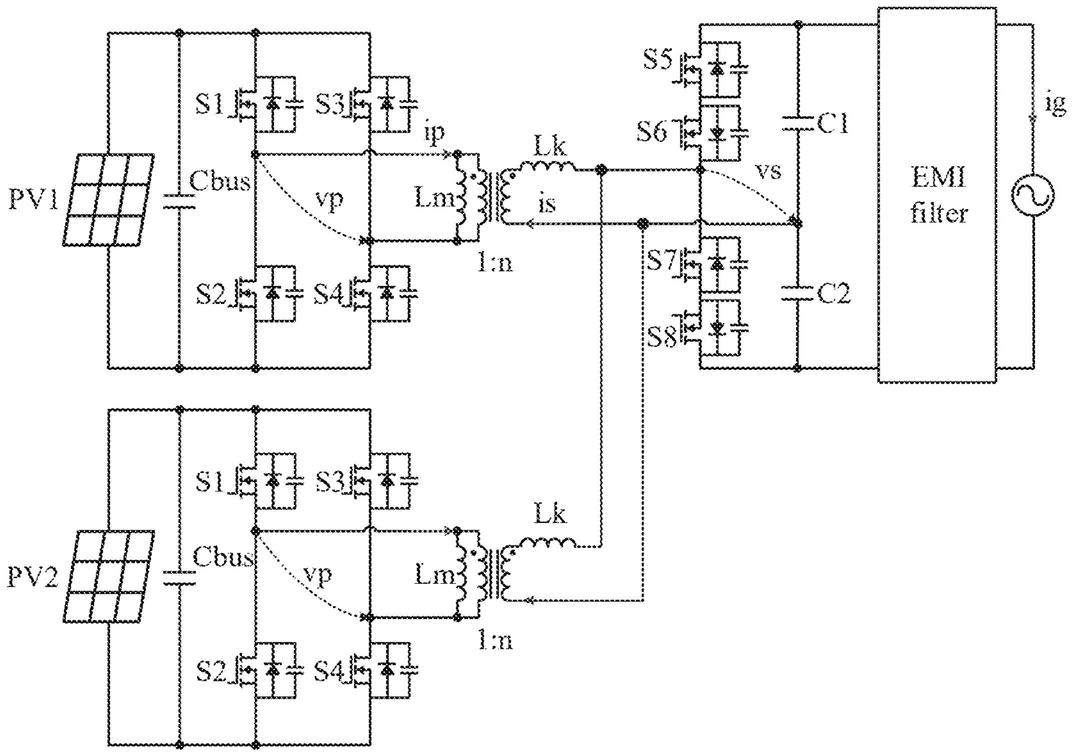
FIG. 3 is a circuit diagram of a micro inverter.

Reference is made to FIG. 3, which is a circuit diagram of a micro inverter.

In an embodiment, a micro inverter includes N primary H-bridges and N transformers. The N transformers share a bi-directional switch leg and a capacitor leg. N is an integer greater than or equal to 2, which is not limited in the embodiment of the present disclosure. For convenience of description, descriptions are provided by taking N being 2 as an example in the embodiment.

As shown in FIG. 3, the micro inverter includes two primary H-bridges and two transformers. Connections in the micro inverter may refer to FIG. 2 and are not repeated herein. Output terminals at the secondary side of the inverter are connected in parallel and share the bi-directional switch leg and the capacitor leg.

In order to make the above objectives, features and advantages of the present disclosure more apparent and easier to be understood, the embodiments of the present disclosure are described in detail below in conjunction with the drawings and the embodiments.

Figure 4:
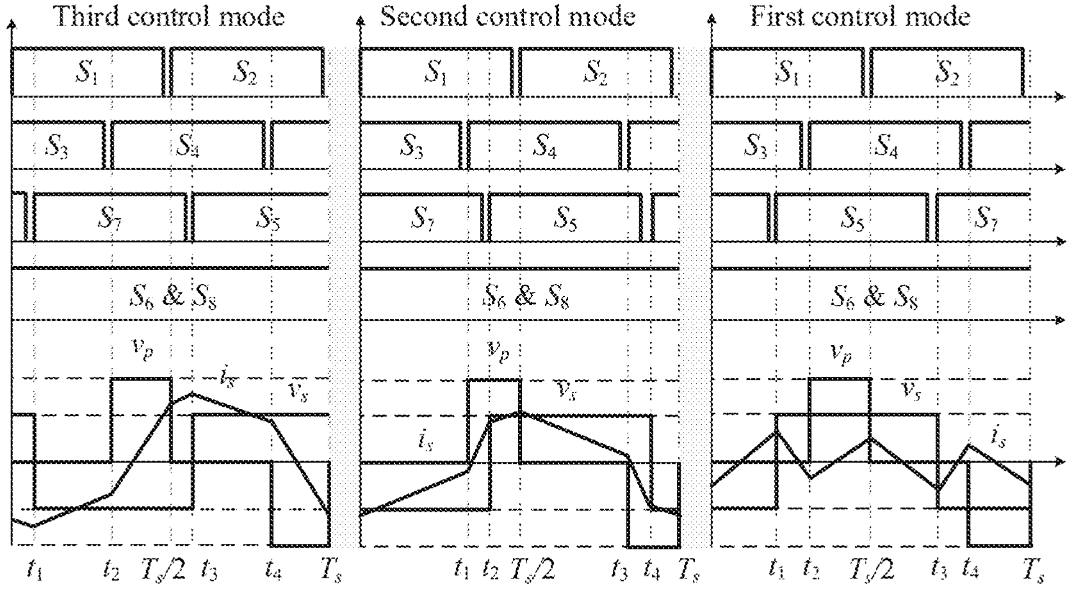
FIG. 4 is a schematic diagram of three control modes for a micro inverter according to an embodiment of the present disclosure.

Reference is made to FIG. 4, which is a schematic diagram of three control modes for a micro inverter according to an embodiment of the present disclosure.

FIG. 4 is a schematic diagram showing waveforms of driving waveforms, primary voltages and secondary voltages, and primary current and secondary current of a transformer in three modulation modes during forward power transmission.

The modulation of the micro inverter may include three modulation modes based on a position relationship between rising/falling edges of the primary voltage and rising/falling edges of the secondary voltage of the transformer.

Referring to FIG. 2, $v_p$ represents the primary voltage of the transformer, and $v_s$ represents the secondary voltage of the transformer.

The control mode is determined based on whether there is overlap in a case of both $v_p$ and $v_s$ are positive.

In a first control mode, all positive voltages of the primary voltage of the transformer overlap with part positive voltages of the secondary voltage of the transformer.

In a second control mode, part positive voltages of the primary voltage of the transformer overlap with part positive voltages of the secondary voltage of the transformer.

In a third control mode, any positive voltage of the primary voltage of the transformer does not overlap with any positive voltage of the secondary voltage of the transformer.

The three control modes are analyzed below.

Based on the division of the modulation modes, a range for the internal phase shift angles and a range for the external phase shift angles in the three modulation modes in the forward power transmission and the reverse power transmission may be obtained, as shown in the following Table 1. The range of the internal phase shift angle does not change with the power transmission direction. In reverse power transmission, the range of the external phase shift angle becomes the opposite of the range of the external phase shift angle in the forward power transmission, which is consistent with the physical meaning of the external phase shift angle.

TABLE 1 ranges of internal phase shift angles and external phase shift angles of micro inverter in three modulation modes

| Power transmission direction | Modulation mode | Range of internal phase shift angle | Range of external phase shift angle |
|---|---|---|---|
| Forward | Mode 1 | $0 \le D_1 \le 0.5$ | $0.5(1 - D_1) < D_2 \le 0.5$ |
| | Mode 2 | $0 \le D_1 \le 0.5$ | $0.5D_1 < D_2 \le 0.5(1 - D_1)$ |
| | Mode 3 | $0 \le D_1 \le 0.5$ | $0 \le D_2 \le 0.5D_1$ |
| Reverse | Mode 1 | $0 \le D_1 \le 0.5$ | $-0.5 \le D_2 < 0.5(D_1 - 1)$ |
| | Mode 2 | $0 \le D_1 \le 0.5$ | $0.5(D_1 - 1) \le D_2 < -0.5D_1$ |
| | Mode 3 | $0 \le D_1 \le 0.5$ | $-0.5D_1 \le D_2 \le 0$ |

In Table 1, $D_1$ and $D_2$ represent per unit values with a as a reference.

Figure 5:
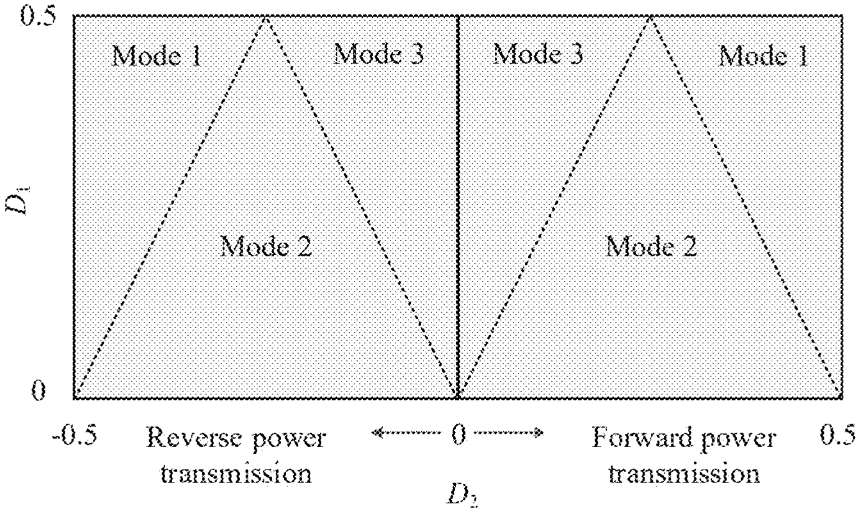
FIG. 5 is a schematic diagram of modulation modes in a full transmission power range according to an embodiment of the present disclosure.

Based on Table 1, a schematic diagram of modulation modes in a full transmission power range may be obtained shown in FIG. 5. In FIG. 5, the ranges of the internal phase shift angles and the external phase shift angles in modulation modes in the forward power transmission and the ranges of the internal phase shift angles and the external phase shift angles in corresponding modulation modes in the reverse power transmission are symmetrical about a vertical axis $D_2=0$.

The power per unit value $P_{trans}$ transmitted in a switching cycle in the three control modes is equal to a ratio of a transmission power to a reference transmission power, and may be expressed as:

$$Ptrans = \begin{cases} \text{mode 3}: (1 - 2D_2)(1 - 2D_1) \\ \text{mode 2}: 2D_2 - 4D_2^2 - D_1^2 \\ \text{mode 1}: 2D_2(1 - 2D_1) \end{cases}$$

With the reference transmission power $P_N = nv_{dc}/(4f_sL_k)$, maximum transmission powers in different modes may be calculated. Based on the range of $D_1$ and $D_2$ in Table 1 and the above $P_{trans}$, the maximum transmission powers in different modes may be obtained:

$$Ptrans = \begin{cases} \text{mode 3}: P_N/8 \\ \text{mode 2}: P_N/4 \\ \text{mode 1}: P_N/8 \end{cases}$$

It can be seen that the transmission power ranges in different modulation modes vary greatly. In the first control mode and the third control mode, the transmission power ranges are the same, which are both $[0, P_N/8]$, and the maximum transmission power in the second control mode is twice the maximum transmission power in the first control mode and the third control mode.

Based on the above analysis, the following control mode switching solutions are provided in the embodiment of the present disclosure.

A first control mode switching solution is provided below.

In an embodiment, the micro inverter includes: a controller, a primary H-bridge, a transformer, a bi-directional switch leg, and a capacitor leg.

An input terminal of the primary H-bridge is connected to a direct-current power supply. Two output terminals of the primary H-bridge are respectively connected to two terminals of a primary side of the transformer. Two terminals of a secondary side of the transformer are respectively connected to an intermediate terminal of the bi-directional switch leg and an intermediate terminal of the capacitor leg. The bi-directional switch leg and the capacitor leg are connected in parallel. The topology of the micro inverter is described in detail in FIG. 2 and FIG. 3, which is not repeated herein.

The controller is configured to switch a control mode of the primary H-bridge and the bi-directional switch leg in a case that a phase of a grid voltage is an odd multiple of 0.25π in each cycle. A positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

For example, in a case that the phase of the grid voltage is greater than 0.25π and less than 0.75π or the phase of the grid voltage is greater than 1.25π and less than 1.75π, the second control mode is adopted; and in a case that the phase of the grid voltage is in other phase intervals, the first control mode is adopted.

The specific control modes are not limited in the present disclosure. For example, in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

Figure 6:
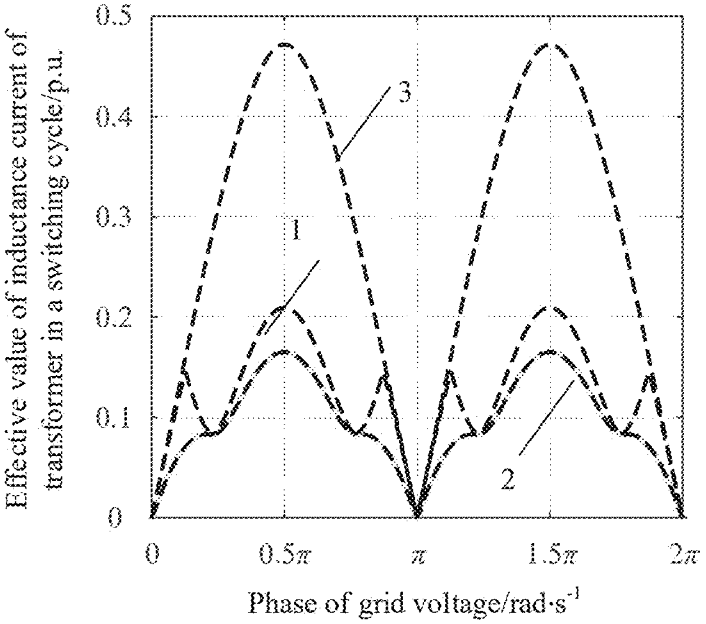
FIG. 6 is a schematic diagram showing curves of effective current values in three control modes in one switching cycle according to an embodiment of the present disclosure.

Reference is made to FIG. 6, which is a schematic diagram showing curves of effective values of an inductance current of a transformer in three control modes in one switching cycle according to an embodiment of the present disclosure.

The curves in FIG. 6 refer to the current of the transformer.

It can be seen from FIG. 6 that in one cycle of 2*x* of the grid voltage, a smaller effective value of the inductance current of the transformer in the three control modes indicates a lower power consumption. Therefore, a control mode, in which a small effective value of the inductance current of the transformer is achieved, may be determined based on the curves of the effective values of the inductance current of the transformer in the three control modes.

It can be seen from FIG. 6 that in a case that the phase of the grid voltage is an odd multiple of 0.25π, that is, the phase of the grid voltage is 0.25π, 0.75π, 1.25π and 1.75π in one power frequency cycle, the control mode of the primary H-bridge and the bi-directional switch leg is switched. The second control mode is adopted in a case that the phase is greater than 0.25π and less than 0.75π or the phase is greater than 1.25π and less than 1.75π, and the first control mode is adopted in a case that the phase of the grid voltage is in other phase intervals. The effective value of the inductance current of the transformer in the third control mode 3 is too large, so the third control mode may not be adopted.

Therefore, according the technical solutions in the embodiments of the present disclosure, the first control mode is adopted in a case of a low grid voltage and the second control mode is adopted in a case of a high grid voltage, thereby ensuring that the effective value of the inductance current of the transformer is minimized in one power frequency cycle, and improving the energy conversion efficiency of the micro inverter.

A second control mode switching solution is provided below.

In the technical solution in the above embodiments, the control mode is switched based on the phase of the grid voltage. In the following control mode switching solution, the control mode is switched based on the power.

In an embodiment, the micro inverter includes: a controller, a primary H-bridge, a transformer, a bi-directional switch leg, and a capacitor leg.

An input terminal of the primary H-bridge is connected to a direct-current power supply. Two output terminals of the primary H-bridge are respectively connected to two terminals of a primary side of the transformer. Two terminals on a secondary side of the transformer are respectively connected to an intermediate terminal of the bi-directional switch leg and an intermediate terminal of the capacitor leg. The bi-directional switch leg and the capacitor leg are connected in parallel.

The controller is configured to: in a case that an instruction power of the micro inverter is less than or equal to a preset power, adopt a first control mode or a third control mode to control the primary H-bridge and the bi-directional switch leg; and in a case that the instruction power of the micro inverter is greater than the preset power, adopt a second control mode to control the primary H-bridge and the bi-directional switch leg. A positive voltage overlap interval between voltages of the primary side and voltages of the secondary side of the transformer corresponding to the first control mode, a positive voltage overlap interval between voltages of the primary side and voltages of the secondary side of the transformer corresponding to the second control mode, and a positive voltage overlap interval between voltages of the primary side and voltages of the secondary side of the transformer corresponding to the third control mode are different.

The preset power is $P_N/8$, and $P_N$ is expressed as:

$$P_N=nv_{dc}/(4f_sL_k)$$

where $V_{dc}$ represents a direct-current input voltage of the primary H-bridge, n represents a turn ratio of the transformer, $f_s$ represents a switching frequency, and $L_k$ represents a leakage inductance of the transformer or an inductance of an external independent inductor.

The specific control modes are not limited in the present disclosure. For example, in the first control mode, all positive voltages of the voltages of the primary side of the transformer overlap with part positive voltages of the voltages of the secondary side of the transformer; in the second control mode, part positive voltages of the voltages of the primary side of the transformer overlap with part positive voltages of the voltages of the secondary side of the transformer; and in the third control mode, any positive voltage of the voltages of the primary side of the transformer does not overlap with any positive voltage of the voltages of the secondary side of the transformer.

From the above power transmission equation, it can be seen that the maximum transmission power in the third control mode is same as the maximum transmission power in the first control mode. Therefore, in a case of a small power, the first control mode or the third control mode may be adopted without switching the control mode, thereby avoiding complex control due to frequent switching of control modes. For performing soft switching using the primary switching transistor, the third control mode is adopted in which the transformer current is large and it is easy to perform soft switching. For minimizing the loss of the converter, the first control mode is adopted in which the transformer current is small and the on-state loss generated is small.

In a case of a large power, the second control mode may be adopted.

A third control mode switching solution is provided below.

A technical solution is further provided in an embodiment of the present disclosure. The technical solution combines the above phase-based switching control mode and the power-based switching control mode, thereby achieving the advantages of the two solutions.

In an embodiment, the micro inverter includes: a controller, a primary H-bridge, a transformer, a bi-directional switch leg, and a capacitor leg.

An input terminal of the primary H-bridge is connected to a direct-current power supply. Two output terminals of the primary H-bridge are respectively connected to two terminals of a primary side of the transformer. Two terminals of a secondary side of the transformer are respectively connected to an intermediate terminal of the bi-directional switch leg and an intermediate terminal of the capacitor leg. The bi-directional switch leg and the capacitor leg are connected in parallel.

The controller is configured to: in a case that an instruction power of the micro inverter is less than or equal to a preset power, adopt a first control mode to control the primary H-bridge and the bi-directional switch leg; in a case that the instruction power of the micro inverter is greater than the preset power and a phase is greater than 0.25π and less than 0.75π or the phase is greater than 1.25π and less than 1.75π, adopt a second control mode; and in a case that the instruction power of the micro inverter is greater than the preset power and the phase is in other phase intervals, adopt the first control mode. A positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

The specific control modes are not limited in the present disclosure. For example, in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

The preset power is $P_N/8$, and $P_N$ is expressed as:

$$P_N = nv_{dc}/(4f_sL_k)$$

where $V_{dc}$ represents a direct-current input voltage of the primary H-bridge, n represents a turn ratio of the transformer, $f_s$ represents a switching frequency, and $L_k$ represents a leakage inductance of the transformer or an inductance of an external independent inductor.

In the technical solution according to the embodiment of the present disclosure, both the power instruction and the phase of the grid voltage are considered. Both the instruction power and the grid voltage are considered, and a control mode in which a small effective current value is achieved is adopted while minimizing the number of switching, thereby reducing power consumption and improving the energy conversion efficiency of the micro inverter.

Based on the micro inverter in the above embodiments, a photovoltaic system is further provided according to an embodiment of the present disclosure.

The photovoltaic system includes the micro inverter described in any one of the above embodiments, and direct-current power supply is a photovoltaic module. It should be understood that each of primary H-bridges is connected to a photovoltaic module. The microinverter may include one primary H-bridge or multiple primary H-bridges, which is not limited in the embodiments.

Based on the micro inverter and the photovoltaic system according to the above embodiments, a control method for a micro inverter is further provided according to an embodiment of the present disclosure.

In the control method for a micro inverter according to the embodiment of the present disclosure, the micro inverter includes: a primary H-bridge, a transformer, a bi-directional switch leg and a capacitor leg.

The method includes: switching a control mode of the primary H-bridge and the bi-directional switch leg in a case that a phase of a grid voltage is an odd multiple of 0.25π in each cycle.

For example, a second control mode is adopted in a case that the phase of the grid voltage is greater than 0.25π and less than 0.75π or the phase of the grid voltage is greater than 1.25 π and less than 1.75π, and a first control mode is adopted in a case that the phase of the grid voltage is in other phase intervals. A positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

The specific control modes are not limited in the present disclosure. For example, in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

Therefore, according the technical solution in the embodiment of the present disclosure, the first control mode is adopted in a case of a low grid voltage and the second control mode is adopted in a case of a high grid voltage, thereby ensuring that the effective value of the inductance current of the transformer is minimized in one power frequency cycle, and improving the energy conversion efficiency of the micro inverter.

In an embodiment of the present disclosure, a control method for a micro inverter is further provided. The micro inverter includes: a primary H-bridge, a transformer, a bi-directional switch leg and a capacitor leg.

The method includes: adopting a first control mode to control the primary H-bridge and the bi-directional switch leg in a case that an instruction power of the micro inverter is less than or equal to a preset power; adopting a second control mode in a case that the instruction power of the micro inverter is greater than the preset power and a phase is greater than 0.25π and less than 0.75π or the phase is greater than 1.25π and less than 1.75π; and adopting the first control mode in a case that the instruction power of the micro inverter is greater than the preset power and the phase is in other phase intervals. A positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

The specific control modes are not limited in the present disclosure. For example, in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

In an embodiment of the present disclosure, a control method for a micro inverter is further provided. The micro inverter includes: a primary H-bridge, a transformer, a bi-directional switch leg and a capacitor leg.

The method includes: adopting a first control mode or a third control mode to control the primary H-bridge and the bi-directional switch leg in a case that an instruction power of the micro inverter is less than or equal to a preset power; and adopting a second control mode to control the primary H-bridge and the bi-directional switch leg in a case that the instruction power of the micro inverter is greater than the preset power. A positive voltage overlap interval between voltages of the primary side and voltages of the secondary side of the transformer corresponding to the first control mode, a positive voltage overlap interval between voltages of the primary side and voltages of the secondary side of the transformer corresponding to the second control mode, and a positive voltage overlap interval between voltages of the primary side and voltages of the secondary side of the transformer corresponding to the third control mode are different.

The specific control modes are not limited in the present disclosure. For example, in the first control mode, all positive voltages of the voltages of the primary side of the transformer overlap with part positive voltages of the voltages of the secondary side of the transformer; in the second control mode, part positive voltages of the voltages of the primary side of the transformer overlap with part positive voltages of the voltages of the secondary side of the transformer; and in the third control mode, any positive voltage of the voltages of the primary side of the transformer does not overlap with any positive voltage of the voltages of the secondary side of the transformer.

The preset power is $P_N/8$, and $P_N$ is expressed as:

$$P_N = n v_{dc}/(4 f_s L_k)$$

where $v_{dc}$ represents a direct-current input voltage of the primary H-bridge, n represents a turn ratio of the transformer, $f_s$ represents a switching frequency, and $L_k$ represents a leakage inductance of the transformer or an inductance of an external independent inductor.

In the technical solution according to the embodiment of the present disclosure, both the power instruction and the phase of the grid voltage are considered. Both the instruction power and the grid voltage are considered, and a control mode in which a small effective current value is achieved is adopted while minimizing the number of switching, thereby reducing power consumption and improving the energy conversion efficiency of the micro inverter.

It should be noted that the embodiments in the present disclosure are described in a progressive manner, and each of the embodiments focuses on its differences from the other embodiments. The same and similar parts among the embodiments may be referred to each other. The system or device disclosed in the embodiments correspond to the method disclosed in the embodiments, and therefore are described in a relatively simple way. Reference may be made to the description of the method for relevant details.

The disclosed embodiments are described above so that those skilled in the art can make or use the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A micro inverter, comprising: a controller, a primary H-bridge, a transformer, a bi-directional switch leg, and a capacitor leg, wherein an input terminal of the primary H-bridge is connected to a direct-current power supply; two output terminals of the primary H-bridge are respectively connected to two terminals of a primary side of the transformer; two terminals of a secondary side of the transformer are respectively connected to an intermediate terminal of the bi-directional switch leg and an intermediate terminal of the capacitor leg; and the bi-directional switch leg and the capacitor leg are connected in parallel; and the controller is configured to switch a control mode of the primary H-bridge and the bi-directional switch leg in a case that a phase of a grid voltage is an odd multiple of 0.25π in each cycle.

2. The micro inverter according to claim 1, wherein the controller is configured to adopt a second control mode in a case that the phase of the grid voltage is greater than 0.25π and less than 0.75π or the phase of the grid voltage is greater than 1.25π and less than 1.75π, and adopt a first control mode in a case that the phase of the grid voltage is in other phase intervals; wherein a positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

3. The micro inverter according to claim 2, wherein in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

4. A micro inverter, comprising: a controller, a primary H-bridge, a transformer, a bi-directional switch leg, and a capacitor leg, wherein an input terminal of the primary H-bridge is connected to a direct-current power supply; two output terminals of the primary H-bridge are respectively connected to two terminals of a primary side of the transformer; two terminals on a secondary side of the transformer are respectively connected to an intermediate terminal of the bi-directional switch leg and an intermediate terminal of the capacitor leg; and the bi-directional switch leg and the capacitor leg are connected in parallel; and the controller is configured to: in a case that an instruction power of the micro inverter is less than or equal to a preset power, adopt a first control mode to control the primary H-bridge and the bi-directional switch leg; in a case that the instruction power of the micro inverter is greater than the preset power and a phase is greater than 0.25π and less than 0.75π or the phase is greater than 1.25π and less than 1.75π, adopt a second control mode; and in a case that the instruction power of the micro inverter is greater than the preset power and the phase is in other phase intervals, adopt the first control mode;

wherein a positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

5. The micro inverter according to claim 4, wherein in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

6. A micro inverter, comprising: a controller, a primary H-bridge, a transformer, a bi-directional switch leg, and a capacitor leg, wherein an input terminal of the primary H-bridge is connected to a direct-current power supply; two output terminals of the primary H-bridge are respectively connected to two terminals of a primary side of the transformer; two terminals of a secondary side of the transformer are respectively connected to an intermediate terminal of the bi-directional switch leg and an intermediate terminal of the capacitor leg; and the bi-directional switch leg and the capacitor leg are connected in parallel; and the controller is configured to: in a case that an instruction power of the micro inverter is less than or equal to a preset power, adopt a first control mode or a third control mode to control the primary H-bridge and the bi-directional switch leg; and in a case that the instruction power of the micro inverter is greater than the preset power, adopt a second control mode to control the primary H-bridge and the bi-directional switch leg;

wherein a positive voltage overlap interval between voltages of the primary side and voltages of the secondary side of the transformer corresponding to the first control mode, a positive voltage overlap interval between voltages of the primary side and voltages of the secondary side of the transformer corresponding to the second control mode, and a positive voltage overlap interval between voltages of the primary side and voltages of the secondary side of the transformer corresponding to the third control mode are different.

7. The micro inverter according to claim 6, wherein in the first control mode, all positive voltages of the voltages of the primary side of the transformer overlap with part positive voltages of the voltages of the secondary side of the transformer; in the second control mode, part positive voltages of the voltages of the primary side of the transformer overlap with part positive voltages of the voltages of the secondary side of the transformer; and in the third control mode, any positive voltage of the voltages of the primary side of the transformer does not overlap with any positive voltage of the voltages of the secondary side of the transformer.

8. A photovoltaic system, comprising the micro inverter according to claim 1, wherein the direct-current power supply is a photovoltaic module.

9. A control method for a micro inverter, wherein the micro inverter comprises: a primary H-bridge, a transformer, a bi-directional switch leg and a capacitor leg;

wherein the control method comprises:

obtaining a phase of a grid voltage; and switching a control mode of the primary H-bridge and the bi-directional switch leg in a case that the phase of the grid voltage is an odd multiple of 0.25π in each cycle.

10. The control method according to claim 9, wherein the switching a control mode of the primary H-bridge and the bi-directional switch leg in a case that the phase of the grid voltage is an odd multiple of 0.25π in each cycle comprises:

adopting a second control mode in a case that the phase of the grid voltage is greater than 0.25π and less than 0.75π or the phase of the grid voltage is greater than 1.25π and less than 1.75π, and adopting a first control mode in a case that the phase of the grid voltage is in other phase intervals; wherein a positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

11. The control method according to claim 10, wherein in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

12. A control method for a micro inverter, wherein the micro inverter comprises: a primary H-bridge, a transformer, a bi-directional switch leg and a capacitor leg;

wherein the control method comprises:

adopting a first control mode to control the primary H-bridge and the bi-directional switch leg in a case that an instruction power of the micro inverter is less than or equal to a preset power; adopting a second control mode in a case that the instruction power of the micro inverter is greater than the preset power and a phase is greater than 0.25 π and less than 0.75π or the phase is greater than 1.25π and less than 1.75π; and adopting the first control mode in a case that the instruction power of the micro inverter is greater than the preset power and the phase is in other phase intervals;

wherein a positive voltage overlap interval between voltages of the primary side and voltages of the secondary side of the transformer corresponding to the first control mode is different from a positive voltage overlap interval between voltages of the primary side and voltages of the secondary side of the transformer corresponding to the second control mode.

13. The control method according to claim 12, wherein in the first control mode, all positive voltages of the voltages of the primary side of the transformer overlap with part positive voltages of the voltages of the secondary side of the transformer; and in the second control mode, part positive voltages of the voltages of the primary side of the transformer overlap with part positive voltages of the voltages of the secondary side of the transformer.

14. A control method for a micro inverter, wherein the micro inverter comprises: a primary H-bridge, a transformer, a bi-directional switch leg and a capacitor leg;

wherein the control method comprises:

adopting a first control mode or a third control mode to control the primary H-bridge and the bi-directional switch leg in a case that an instruction power of the micro inverter is less than or equal to a preset power; and adopting a second control mode to control the primary H-bridge and the bi-directional switch leg in a case that the instruction power of the micro inverter is greater than the preset power;

wherein a positive voltage overlap interval between voltages of the primary side and voltages of the secondary side of the transformer corresponding to the first control mode, a positive voltage overlap interval between voltages of the primary side and voltages of the secondary side of the transformer corresponding to the second control mode, and a positive voltage overlap interval between voltages of the primary side and voltages of the secondary side of the transformer corresponding to the third control mode are different.

15. The control method according to claim 14, wherein in the first control mode, all positive voltages of the voltages of the primary side of the transformer overlap with part positive voltages of the voltages of the secondary side of the transformer; in the second control mode, part positive voltages of the voltages of the primary side of the transformer overlap with part positive voltages of the voltages of the secondary side of the transformer; and in the third control mode, any positive voltage of the voltages of the primary side of the transformer does not overlap with any positive voltage of the voltages of the secondary side of the transformer.

16. A photovoltaic system, comprising the micro inverter according to claim 4, wherein the direct-current power supply is a photovoltaic module.

17. A photovoltaic system, comprising the micro inverter according to claim 6, wherein the direct-current power supply is a photovoltaic module.

* * * * *